(12) United States Patent
Namioka et al.

(10) Patent No.: US 11,002,997 B2
(45) Date of Patent: May 11, 2021

(54) SEMICONDUCTOR DEVICE AND METHOD OF MANUFACTURING THE SAME

(71) Applicant: RENESAS ELECTRONICS CORPORATION, Tokyo (JP)

(72) Inventors: Seigo Namioka, Ibaraki (JP); Yasutaka Nakashiba, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/722,394

(22) Filed: Dec. 20, 2019

(65) Prior Publication Data

US 2020/0201084 A1    Jun. 25, 2020

(30) Foreign Application Priority Data

Dec. 21, 2018    (JP) .............................. JP2018-239567

(51) Int. Cl.
*G02F 1/025*    (2006.01)

(52) U.S. Cl.
CPC ........ *G02F 1/025* (2013.01); *G02F 2202/105* (2013.01); *G02F 2203/50* (2013.01)

(58) Field of Classification Search
None
See application file for complete search history.

(56) References Cited

U.S. PATENT DOCUMENTS 9,880,404 B2   1/2018  Ogawa et al.
2009/0189237 A1*  7/2009  Hirano .............. H01L 27/14625
                                                      257/432

FOREIGN PATENT DOCUMENTS

JP          2017-509022 A        3/2017

\* cited by examiner

*Primary Examiner* — Jerry Rahll
(74) *Attorney, Agent, or Firm* — McDermott Will & Emery LLP

(57) ABSTRACT

A semiconductor device includes a first insulating layer, an optical waveguide formed on the first insulating layer, a fixed charge layer formed on the first insulating layer such that the fixed charge layer covers the optical waveguide, and a second insulating layer formed on the fixed charge layer.

18 Claims, 18 Drawing Sheets

SEMICONDUCTOR DEVICE AND METHOD OF MANUFACTURING THE SAME

CROSS-REFERENCE TO RELATED APPLICATIONS

The disclosure of Japanese Patent Application No. 2018-239567 filed on Dec. 21, 2018 including the specification, drawings and abstract is incorporated herein by reference in its entirety.

BACKGROUND

The present disclosure relates to semiconductor device and method of manufacturing the semiconductor device, for example, the present disclosure relates to a semiconductor device including an optical waveguide and method of manufacturing the semiconductor device.

As an optical communication technique, a silicon photonics technique is known. The semiconductor device employing the silicon photonics technique has, for example, an optical modulator for changing the phase of light in an optical waveguide.

Japanese Unexamined Patent Application Publication No. 2017-509022 discloses a pn-type optical modulator including an optical waveguide formed of an n-type semiconductor portion containing an n-type impurity and a p-type semiconductor portion containing a p-type impurity. The optical waveguide constituting the optical modulator is patterned by etching. The n-type semiconductor portion and the p-type semiconductor portion are adjacent to each other in the optical waveguide, and form a pn junction surface. The pn junction surface is formed so as to face both side surfaces of the optical waveguide in the optical waveguide. When a reverse bias voltage is applied to the optical modulator, the depletion region expands from the pn junction surface toward the side surface of the optical waveguide. In the state in which the depletion region is formed and the state in which the depletion region is not formed, the phase of the light traveling in the optical waveguide is different. The optical modulator can electrically control the phase of the light traveling in the optical waveguide by using this characteristic.

When the optical waveguide is formed by patterning the semiconductor layer by dry etching, optical loss due to roughness of the surface of the optical waveguide may occur. In addition, when the optical modulator is driven at a low voltage, the depletion region cannot be sufficiently expanded in the optical waveguide, and as a result, the modulation efficiency of the optical modulator may become insufficient. As described above, in the conventional optical modulator, there is room for improvement from the viewpoint of enhancing the characteristics of the semiconductor device.

It is an object of one embodiment to enhance the properties of a semiconductor device. Other objects and novel features will become apparent from the description of the specification and drawings.

SUMMARY

A semiconductor device according to embodiments includes a fixed charge layer covering an optical waveguide.

A method of manufacturing the semiconductor device according to embodiments includes forming an optical waveguide by processing a semiconductor layer by a dry etching method, and forming a fixed charge layer so as to cover the optical waveguide.

In the semiconductor device according to the embodiment, the characteristics of the semiconductor device including the optical waveguide can be improved.

DETAILED DESCRIPTION

Figure 1:
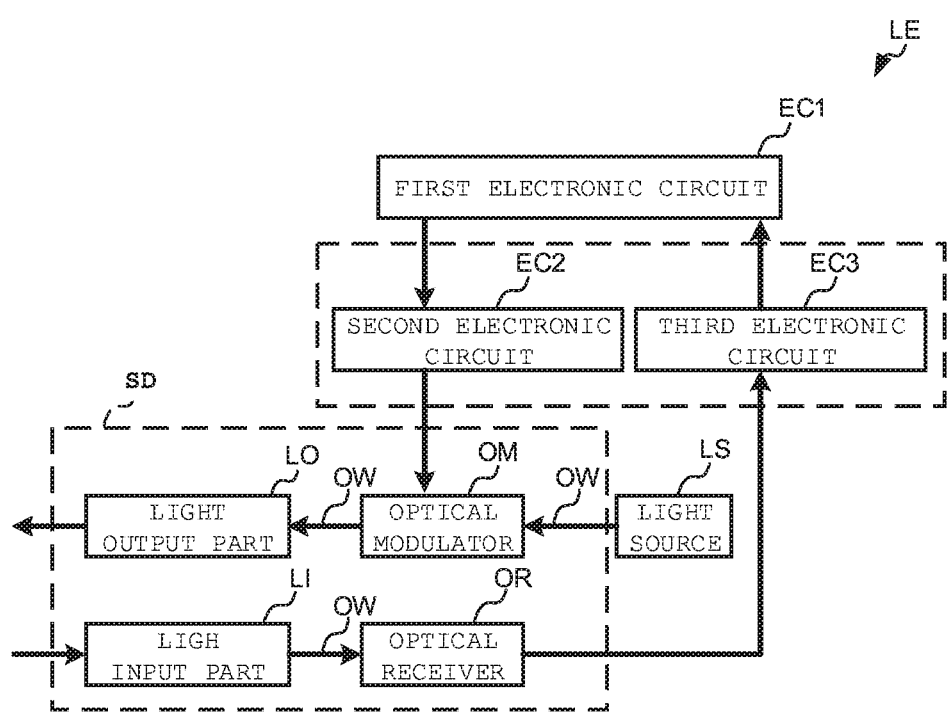
FIG. 1 is a block diagram showing an exemplary circuit configuration of an optoelectronic electric device according to an embodiment.

Hereinafter, a semiconductor device according to an embodiment will be described in detail by referring to the drawings. In the specification and the drawings, the same or corresponding elements are denoted by the same reference numerals, and a repetitive description thereof is omitted. In the drawings, for convenience of description, the configuration may be omitted or simplified.

FIG. 1 is a block diagram showing an exemplary circuit configuration of an optoelectronic hybrid device LE according to a present embodiment.

As shown in FIG. 1, the optoelectronic hybrid device LE includes first electronic circuit EC1, a semiconductor device SD, a light source LS, and IC chip CP. The semiconductor device SD according to the present embodiment includes an optical waveguide OW, an optical modulator LM, an optical output part LO, an optical input part LI, and an optical receiver PR. The IC chip CP includes a second electronic circuit EC2 and a third electronic circuit EC3. The configuration of the semiconductor device SD will be described in detail later.

The first electronic circuit EC1 outputs electric signal for controlling the second electronic circuit EC2 and the third electronic circuit EC3, respectively. The first electronic circuit EC1 receives electric signal outputted from the third electronic circuit EC3. The first electronic circuit EC1 is electrically connected with the second electronic circuit EC2 and the third electronic circuit EC3. The first electronic circuit EC1 is formed of, for example, a known Central Processing Unit (CPU) or Field-Programmable gate array (FPGA) including a control circuit and a storage circuit.

The light source LS emits light. Examples of the type of light source LS include a laser diode LD. A wavelength of the light emitted from the light source LS may be set as appropriate in accordance with the material constituting the optical waveguide OW as long as the emitted light can pass through the inside of the optical waveguide OW. For example, the peak wavelength of the light emitted from the light source LS is 1.0 µm or more and 1.6 µm or less. The light source LS is optically connected to the optical modulator LM via the optical waveguide OW.

The second electronic circuit EC2 outputs an electric signal (control signal) for controlling the operation of the optical modulator LM. More specifically, the second electronic circuit EC2 controls the optical modulator LM based on the control signal received from the first electronic circuit EC1. The second electronic circuits EC2 are electrically connected with the optical modulator LM. The second electronic circuit EC2 is constituted by, for example, a well-known transceiver IC including a control circuit.

The optical modulator LM modulates the phase of the light emitted from the light source LS based on the control signal received from the second electronic circuit EC2. The optical modulator LM generates an optical signal including information included in the control signal. The type of the optical modulator LM is a Mach-Zehnder type optical modulator. The optical modulator LM may be an electrically controlled optical modulator, or a combined optical modulator using a combination of electrical control and thermal control. The optical modulator LM is optically connected with the optical output part LO via the optical waveguide OW.

The optical output part LO outputs the optical signal modulated by the optical modulator LM to the outside of the semiconductor device SD. For example, the optical output part LO emits an optical signal toward an external optical fiber. Examples of the type of the light output part LO include a grating coupler (GC) and a spot size converter (SSC).

The optical input part LI inputs external light into the semiconductor device SD. For example, optical signal emitted from external optical fibers are inputted into the semiconductor device SD. Examples of the type of optical input part LI include a grating coupler (GC) and a spot size converter (SSC). The optical input part LI is optically connected with the optical receiver PR via the optical waveguide OW.

The optical receiver PR generates electron-hole pairs based on the optical signal received from the optical input part LI. The optical receiver PR converts an optical signal into an electric signal. The optical receiver PR may have photoelectric conversion characteristics. Examples of the type of the optical receiver PR include an avalanche photodiode type optical receiver. The optical receiver PR is electrically connected with the third electronic circuit EC3.

The third electronic circuit EC3 processes the electrical signal received from the optical receiver PR and outputs the processed electrical signal to the first electronic circuit EC1. More specifically, the third electronic circuit EC3 amplifies the electric signal received from the optical receiver PR and outputs the amplified electric signal to the first electronic circuit EC1. The third electronic circuit EC3 is constituted by, for example, a known receiver IC including an amplifier circuit.

Next, operation examples of the optoelectronic hybrid device LE according to the present embodiment will be described.

First, the transmission part of the optoelectronic hybrid device LE will be described. The light emitted from the light source LS reaches the optical modulator LM via the optical waveguide OW. The second electronic circuit EC2 controls the operation of the optical modulator LM based on the control signal received from the first electronic circuit EC1, and modulates the light reaching the optical modulator LM. As a result, the electric signal is converted into an optical signal. The optical signal reaches the optical output part LO via the optical waveguide OW, and the optical signal is output to the outside of the semiconductor device SD in the optical output part LO. The optical signal outputted from the semiconductor device SD are guided to another semiconductor device via optical fibers or the like.

Next, the receiving part of the optoelectronic hybrid device LE will be described. An optical signal guided from another semiconductor device through an optical fiber or the like reaches the optical input part LI. The optical signal is guided to the inside of the optical waveguide OW in the optical input part LI. The optical signal reaches the optical receiver PR via the optical waveguide OW, and is converted into an electric signal. The electric signal is processed by the third electronic circuit EC3 and then transmitted to the first electronic circuit EC1.

Next, the configuration of the semiconductor device SD according to the present embodiment will be described.

Figure 2:
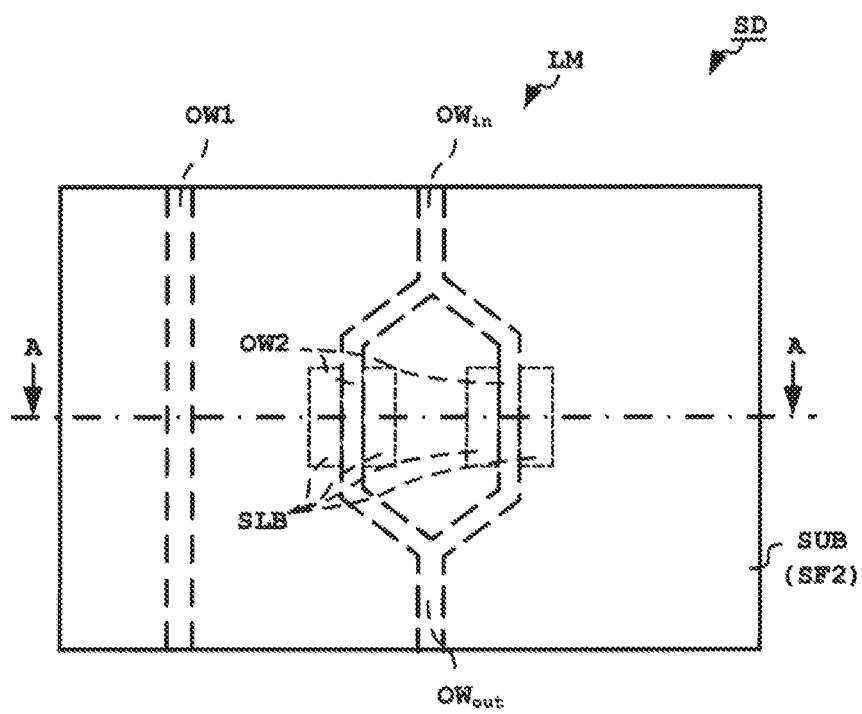
FIG. 2 is a bottom view of a primary portion showing an exemplary configuration of a semiconductor device according to the embodiment.
Figure 3:
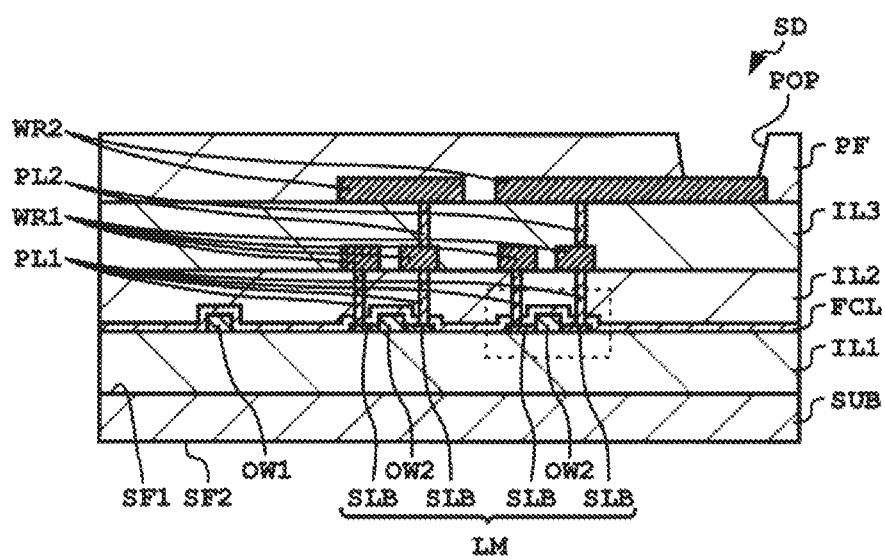
FIG. 3 is a cross-sectional view of a primary portion showing an exemplary configuration of the semiconductor device according to the embodiment.

FIG. 2 is a bottom view of a primary portion of the semiconductor device SD, and FIG. 3 is a cross-sectional view of a primary portion of the semiconductor device SD taken along line A-A in FIG. 2.

As shown in FIG. 3, the semiconductor device SD includes a substrate SUB, a first insulating layer IL1, a first optical waveguide OW1, an optical modulator LM, a fixed-charge layer FCL, a second insulating layer IL2, a first plug PL1, a first wiring WR1, a third insulating layer IL3, a second plug PL2, a second wiring WR2, and a protective film PF. As will be described in detail later, the optical modulator LM includes a pair of second optical waveguides OW2 and two pairs of slab portions SLB adjacent to both side surfaces of the second optical waveguide OW2.

A configuration (size, shape, material, and function) of the second optical waveguide OW2 is the same as a configuration of the first optical waveguide OW1 except that an impurity is included in a portion of the second optical waveguide OW2 and the portion of the second optical waveguide OW2 is adjacent to the pair of slab portions SLB in plan view, though detailed description will be given later. Therefore, only the first optical waveguide OW1 will be described with respect to the configuration similar to each other from the viewpoint of avoiding duplicate description.

The substrate SUB is support member for supporting optical elements such as the first optical waveguide OW1 and the optical modulator LM via the first insulating layer IL1. The substrate SUB includes a first surface (top surface) SF1 and a second surface (back surface) SF2 that are in top and back relation to each other.

Examples of types of substrate SUB include silicon substrate. The silicon substrate is, for example, a silicon single-crystal substrate containing p-type impurities such as boron (B) and phosphorus (P). For example, the plane orientation of the main surface (first surface SF1) of the silicon substrate is (100), and the resistivity of the silicon substrate is 5 Ω·cm or more and 50 Ω·cm or less. A thickness of the substrate SUB is, for example, 100 μm or more and 900 μm or less.

The first insulating layer IL1 is formed on the first surface SF1 of the substrate SUB. The first insulating layer IL1 is a cladding layer for substantially confining the light propagating inside the first optical waveguide OW1 to the inside of the first optical waveguide OW1. The first insulating layer IL1 is formed of a material having a refractive index smaller than that of the material constituting the first optical waveguide OW1. Examples of materials constituting the first insulating layer IL1 include silicon oxide ($SiO_2$). The refractive index of the materials constituting the first insulating IL1 is, for example, 1.46. In this specification, the refractive index is a numerical value for light having a wavelength of 1.5 μm.

It is preferable that a thickness of the first insulating layer IL1 is greater than the light seeping distance from the first optical waveguide OW1, which distance will be described in detail later. From the viewpoint of reducing stress applied to the semiconductor device SD and from the viewpoint of suppressing sticking of the semiconductor wafer by the electrostatic chucks at the time of manufacturing the semiconductor device SD, the thickness of the first insulating layer IL1 is preferable small. For example, the thickness of the first insulating layer IL1 is 2 μm or more and 3 μm or less.

The first optical waveguide OW1 is a path through which light can propagate/travel. The first optical waveguide OW1 is formed on the first insulating layer IL1. The first optical waveguide OW1 is directly or indirectly covered with the first insulating layer IL1 and the second insulating layer IL2. In present embodiment, an upper surface and both sides of the first optical waveguide OW1 are directly contacted with the fixed charge layer FCL, and a bottom surface of the first optical waveguide OW1 is directly contacted with the first insulating layer IL1.

The first optical waveguide OW1 is covered with a first insulating layer IL1 and a charge-fixing layer FCL having a refractive index smaller than that of materials constituting the first optical waveguide OW1. Thus, the light can travel inside the first optical waveguide OW1 while being substantially confined inside the first optical waveguide OW1. However, the light travels inside the first optical waveguide OW1 while seeping out to the outside of the first optical waveguide OW1 by the order of wavelengths of the light.

The material constituting the optical waveguide is a semiconductor material which is transparent to light passing through the inside of the optical waveguide. Example of material constituting the first optical waveguide OW1 includes silicon and germanium. The crystal structures of the materials constituting the first optical waveguide OW1 may be single crystal or polycrystalline. The refractive index of the material constituting the first optical waveguide OW1 is, for example, 3.5.

The cross-sectional shape of the first optical waveguide OW1 in the cross-section perpendicular to the extension direction of the first optical waveguide OW1 may be any shape as long as light can propagate inside the first optical waveguide OW1. Example of the cross-sectional shape of the first optical waveguide OW1 include a rectangular shape and a trapezoidal shape.

The width and the height of the first optical waveguide OW1 may be any size as long as the light can appropriately propagate inside the first optical waveguide OW1. The width and height of the first optical waveguides OW1 may be appropriately set in accordance with conditions such as wavelengths of light passing through the interior of the first optical waveguide OW1, mode of the light, and the like. The first optical waveguide OW1 has a width of, for example, 300 nm or more and a width of 500 nm or less. The height of the first optical waveguide OW1 is, for example, 200 nm or more and 300 nm or less.

The optical modulator LM according to the present embodiment is a pn-type optical modulator. As shown in FIG. 2, the optical modulator LM includes an optical waveguide $OW_{in}$ for inputting, a pair of second optical waveguides OW2 branched from the optical waveguide $OW_{in}$, two pairs of slab portions SLB, and an optical waveguide $OW_{OUT}$ for outputting. That is, each of the optical waveguide $OW_{in}$, the optical waveguide $OW_{in}$, and the second optical waveguide OW2 constitutes a part of the optical modulator LM.

Example of configuration (shape, material, etc.) of the optical waveguide $OW_{in}$ and the optical waveguide $OW_{OUT}$ is the same as that of the first optical waveguide OW1. The second optical waveguide OW2 differs from the first optical waveguide OW1 in that impurity region is formed in portion of the second optical waveguide OW2, sandwiched between the pair of slab portions SLBs. Therefore, the impurity region in the second optical waveguide OW2 will be described.

Figure 4:
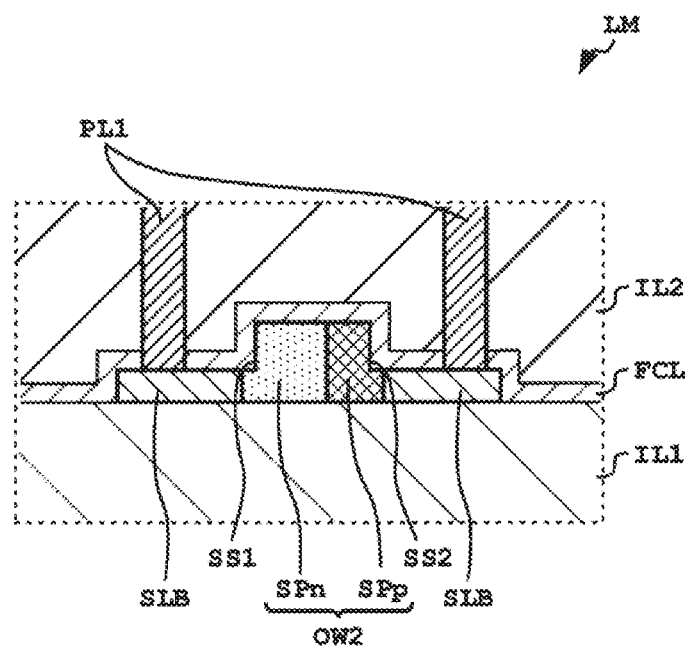
FIG. 4 is a portion enlarged cross-sectional view showing an exemplary configuration of the semiconductor device according to the embodiment.

FIG. 4 is an enlarged cross-sectional view of a portion of an area indicated by a broken line in FIG. 3. As shown in FIG. 4, the second optical waveguide OW2 includes a p-type semiconductor portion SPp formed of a p-type semiconductor and an n-type semiconductor portion SPn formed of an n-type semiconductor. The second optical waveguide OW2 has a first side surface SS1 and a second side surface SS2 which are positioned on opposite sides of the second optical waveguide OW2 in the widthwise directions. The p-type semiconductor portion SPp and the n-type semiconductor portion SPn are formed so as to be adjacent each other in the widthwise direction of the second optical waveguide OW2.

In present embodiment, the n-type semiconductor portion SPn is formed on the first side surface SS1 side inside the second optical waveguide OW2. The p-type semiconductor portion SPp is formed inside the second optical waveguide OW2 on the second side surface SS2 side inside the second optical waveguide OW2.

A p-n junction surface is formed inside the second optical waveguide OW2. The p-n junction surface is formed so as to face both side surfaces of the second optical waveguide OW2. In the present embodiment, the p-n junction surface is positioned in the second side surface SS2 side in the widthwise direction of the second optical waveguide OW2. That is, the p-n junction surface is closer to the second side surface SS2 than the first side surface SS1 in the optical waveguide.

Here, the "widthwise direction" of the second optical waveguide OW2 is a direction in which the first side surface SS1 and the second side surface SS2 oppose each other, and is a direction perpendicular to the extending direction of the second optical waveguide OW2 in plan view.

In the cross-section perpendicular to the extension of the second optical waveguide OW2, the occupied area of the n-type semiconductor portion SPn may be larger or smaller than the occupied area of the p-type semiconductor portion SPp, or may be the same as the occupied area of the p-type semiconductor portion SPp. Although details will be described later, from the viewpoint of increasing the modulation efficiency of the optical modulator LM, it is preferable that the area occupied by the n-type semiconductor section SPn is larger than the area occupied by the p-type semiconductor section SPp in the cross section. In present embodiment, the area occupied by the n-type semiconductor portion SPn is larger than the area occupied by the p-type semiconductor portion SPp in the cross section.

For the pair of second optical waveguides OW2, an area ratio of the p-type semiconductor portion SPp to the n-type semiconductor portion SPn in the second optical waveguide OW2 and an area ratio of the p-type semiconductor portion SPp to the n-type semiconductor portion SPn in the other second optical waveguide OW2 may be the same or different from each other. In present embodiment, the two area ratios are the same.

The n-type semiconductor constituting the n-type semiconductor portion SPn contains n-type impurities such as arsenic (As) and phosphorus (P). The impurity density of the n-type semiconductor portion SPn is $1 \times 10^{17}/cm^3$ or more. The p-type semiconductor constituting the p-type semiconductor portion SPp contains p-type impurities such as boron (B) and boron difluoride (BF2). The impurity density of the p-type semiconductor portion SPp is $1 \times 10^{17}/cm^3$ or more.

Two pairs of slab portion are formed on the First insulating layer IL1. The configuration of the slab portion SLB is not particularly limited, and a known configuration may be employed as the slab portion of the pn-type modulator. The slab portion SLB is formed on the first insulating layer IL1 so that the slab portion SLB is adjacent to the second optical waveguide OW2 in the widthwise direction of the second optical waveguide OW2. In present embodiment, a pair of slab portions SLB is formed on the first insulating layers IL1 so as to sandwich the second optical waveguide OW2 from both sides. The slab portion SLB adjacent to the n-type semiconductor portion SPn contains the n-type impurity, and the slab portion SLB adjacent to the p-type semiconductor portion SPp contains the p-type impurity. From the viewpoint of suppressing the voltage drop, it is preferable that the impurity concentration in the slab portion SLB is greater than the impurity concentration in the n-type semiconductor portion SPn and the p-type semiconductor portion SPp. The slab portions SLBs are electrically connected to the first plugs PL1.

As shown in FIG. 2, in the optical modulator LM, the light propagating inside the optical waveguide $OW_{in}$ for inputting is split into a pair of second optical waveguides OW2, and after being phase-shifted by one or both of the pair of second optical waveguides OW2, the light is combined by the outputting optical waveguide $OW_{OUT}$. Then, by interfering light generated in the optical waveguide $OW_{OUT}$, the amplitudes of the light are controlled, and as a result, an optical signal can be generated.

The optical modulator LM can control the phase of the light passing through plasma effect. Specifically, by applying a reverse bias (voltage) between the p-type semiconductor portion SPp and the n-type semiconductor portion SPn, the depletion regions extend from the p-n junction surface toward both side surfaces of the second optical waveguide OW2. The phase of the light traveling in the second optical waveguide OW2 differs between the state in which the depletion region is formed and the state in which the depletion region is not formed. In this manner, the optical modulator LM can electrically control the phase of the light traveling in the second optical waveguide OW2.

The fixed charge layer FCL is formed on the first insulating layer IL1 so as to cover the optical modulator LM including the first optical waveguide OW1 and the second optical waveguide OW2. The fixed charge layer FCL is an insulating layer including a negative fixed charge formed so as to cover the first optical waveguide OW1 and the second optical waveguide OW2 while the fixed charge layer FCL is formed on the first optical waveguide OW1 and the second optical waveguide OW2. As a result, the fixed charge layer FCL forms an inversion layer on the surfaces of the first optical waveguide OW1 and the second optical waveguide OW2.

The fixed charge layer FCL is formed of a material capable of performing the above-mentioned functions, and may be selected according to a material constituting the first optical waveguide OW1 and the second optical waveguide OW2. The fixed charge layer FCL is formed of at least one material selected from a group consisting of hafnium oxide, aluminum oxide, zirconium oxide, tantalum oxide, titanium oxide, hafnium nitride, aluminum nitride, hafnium oxynitride, and aluminum oxynitride. The material constituting the fixed charge layer FCL is preferably hafnium oxide. The fixed charge layer FCL may be a single layer film composed of the above-mentioned material, or may be a stacked film composed of a plurality of layers composed of the above-mentioned materials.

The fixed charge layer FCL may contain components such as silicon (Si) and nitrogen (N) from the viewpoint of heat resistance. The concentration of the component is appropriately determined within a range in which the insulating property of the fixed charge layer FCL is not impaired.

The fixed charge layer FCL may be in direct contact or indirect contact with the first optical waveguide OW1 and the n-type semiconductor portion SPn and the p-type semiconductor portion SPp of the second optical waveguide OW2 (see modified example described later). From the viewpoint of effectively forming the inversion layer, it is preferable that the fixed charge layer FCL is in direct contact with the first optical waveguide OW1 and the second optical waveguide OW2. In present embodiment, the fixed charge layer FCL directly contacts with the first optical waveguide OW1 and the second optical waveguide OW2.

A thickness of the fixed charge layer FCL may be sufficient to form the inversion layer. If the thickness of the fixed charge layer FCL is too small, the inversion layer is not sufficiently formed, and the effect of the fixed charge layer FCL tends not to be obtained. Further, if the thickness of the fixed charge layer FCL is too great, a thick inversion layer is formed, and the phase difference of the light propagating in the second optical waveguide OW2 becomes small between the state in which the depletion region is formed and the state in which the depletion region is not formed, and as a result, the modulation efficiency of the optical modulator LM tends to be lowered. From this viewpoint, the thickness of the fixed charge layer FCL is preferable 1 nm or more and 10 nm or less, more preferably about 5 nm.

The second insulating layer IL2 is formed on the fixed charge layer FCL. The second insulating layer IL2 is formed on the first insulating layer IL1 so as to cover the first optical waveguide OW1 and the optical modulator LM with the fixed charge layer FCL interposed therebetween. The second insulating layer IL2 is formed of a material having a refractive index smaller than that of the material constituting the first optical waveguide OW1 and the second optical waveguide OW2. Examples of material constituting the second insulating layer IL2 include silicon oxide ($SiO_2$). The refractive index of the material constituting the second insulating IL2 is, for example, 1.46.

A thickness of the second insulating layer IL2 is preferably 1.5 μm or more from the viewpoint of suppressing scattering of light seeping out of the second optical waveguide OW2 by the first wiring WR1 formed on the second insulating layer IL2. Further, from the viewpoint of easiness of manufacturing processes, it is more preferable that the thickness of the second insulating layer IL2 is about 2 μm.

The first plugs PL1 are formed to fill through holes formed in the second insulating layers IL2. The first plugs PL1 electrically connect the slab portions SLB of the optical modulator LM and the first wiring WR1 to each other. The first plugs PL1 are formed so as to reach the p-type semiconductor portions SPp and the n-type semiconductor portions SPn of the optical modulator LM along the thickness direction of the second insulating layers IL2. As the first plug PL1, a well-known structure adopted as a plug in the semiconductor technology can be adopted. Example of material of the first plug PL1 includes tungsten (W).

The first wiring WR1 is formed on the second insulating layer IL2. The first wiring WR1 is electrically connected to the optical modulator LM through the first plugs PL1. For the first wiring WR1, a well-known structure employed as a wiring in the semiconductor technology can be employed. Examples of the first wiring WR1 include an aluminum wiring in which a titanium layer, a titanium nitride layer, an aluminum layer, a titanium nitride layer, and a titanium layer are stacked in this order. Instead of the aluminum layer, a copper layer or a tungsten layer may be used. In present embodiment, the first wiring WR1 is the aluminum wiring.

The third insulating layer IL3 is formed on the second insulating layer IL2 so as to cover the first wiring WR1. Example of material constituting the third insulating layer IL3 is the same as that of the second insulating layer IL2. A thickness of the third insulating IL3 is, for example, 1 μm or more and 2.5 μm or less.

The second plugs PL2 are formed so as to fill through holes formed in the third insulating layer IL3. The second plugs PL2 electrically connect the first wiring WR1 and the second wiring WR2 to each other. The second plug PL2 is formed so as to reach the first wiring WR1 along the thickness direction of the third insulating layer IL3. As for the second plug PL2, a well-known structure adopted as a plug in the semiconductor technology can be adopted. Example of material of the second plug PL2 is the same as that of the first plug PL1.

The second wiring WR2 is formed on the third insulating layer IL3. The second wiring WR2 is electrically connected to the first wiring WR1 through the second plug PL2. For the second wiring WR2, a well-known structure employed as a wiring in the semiconductor technology can be employed. Example of material of the second wiring WR2 is similar to those of the first wiring WR1.

The protective film PF is formed on the third insulating layer IL3. The protective film PF is formed with a pad opening POP exposing the second wiring WR2 to the outside of the pad opening POP. The protective film PF may protect the semiconductor device SD. Example of material for the protective film PF includes silicon oxide, silicon oxynitride, silicon nitride, and Phospho Silicate Glass. A thickness of the protective film PF is, for example, 1 μm or more and 2.5 μm or less. A portion of the second wiring WR2 is exposed inside the pad opening portion POP formed in the protective film PF.

The portion of the second wiring WR2 exposed from the pad opening POP constitutes a pad portion to be connected to an external wiring such as a bonding wire, for example. It is preferable that the pad opening portion POP does not overlap with the optical element in plan view from the viewpoint of suppressing damage that may occur to the optical element when the external wiring is bonded to the pad portion.

Here, the operation of the fixed charge layer FCL will be described. Here, (1) the action of the fixed charge layer FCL on the optical modulator and (2) the action of the fixed charge layer FCL on the optical waveguide will be described.

(1) The action of the fixed charge layer FCL on the optical modulator

Figure 5:
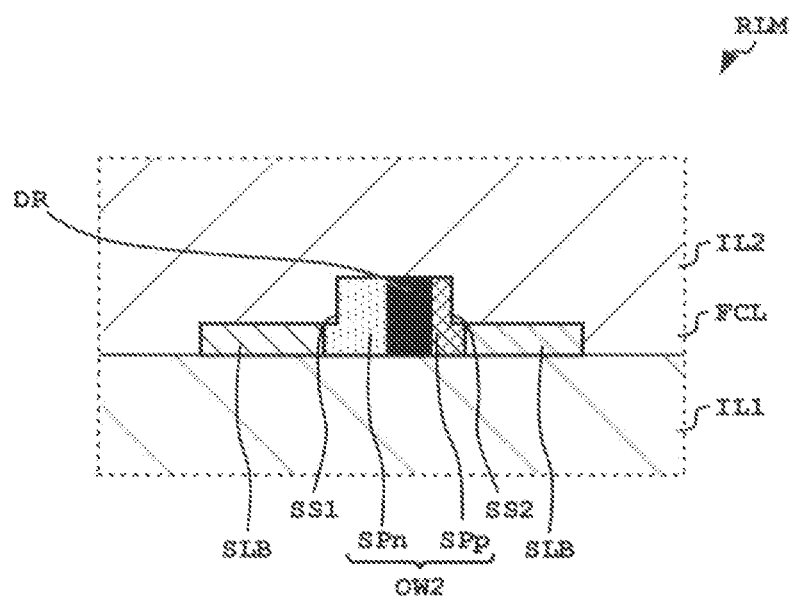
FIG. 5 is a partial enlarged cross-sectional view showing a condition in which depletion region is formed in the comparative optical modulator.
Figure 6:
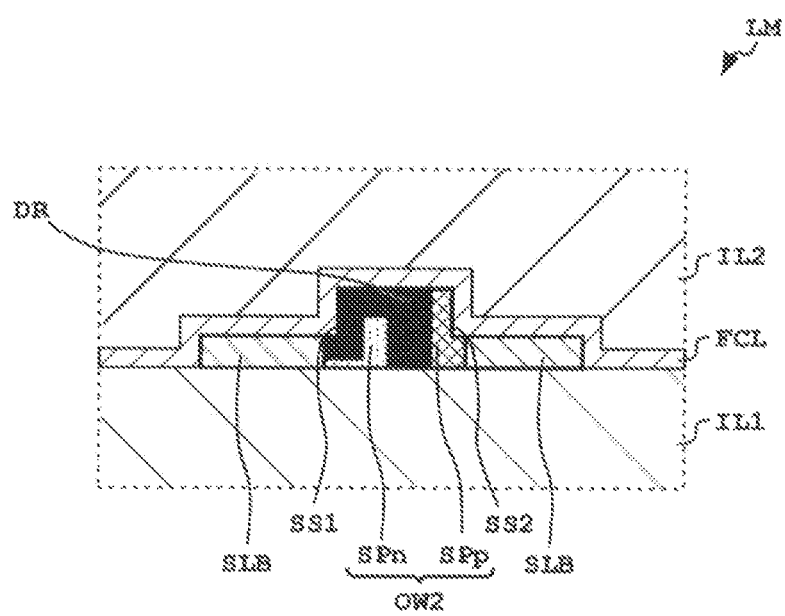
FIG. 6 is a partial enlarged cross-sectional view showing a condition in which depletion region is formed in the optical modulator according to the embodiment.

For comparison, the optical modulator RLM (hereinafter also referred to as "optical modulator for comparison") which is not covered with the fixed charge layer FCL will also be described. FIG. 5 is a partial enlargement cross-sectional view showing a state in which the depletion region DR is formed in the comparative optical modulator RLM, and FIG. 6 is a partial enlargement cross-sectional view showing a state in which the depletion region DR is formed in the optical modulator LM according to present embodiment. In FIGS. 5 and 6, the depletion region DR is shown as a black region.

In the comparative optical modulator RLM, depletion region DR is formed from the p-n junction surface toward the side surface of the optical waveguide in the second optical waveguide OW2 when reverse biasing is applied to the comparative optical modulator RLM. It is assumed that a reverse-bias voltage of about 5V is applied to the second optical waveguide OW2 having a width of 400 nm and a height of 200 nm. In the optical modulator RLM for comparison, as shown in FIG. 5, the depletion regions DR extends from the p-n junction surface toward both side surfaces of the second optical waveguide OW2 by about 100 nm. That is, in the optical modulator RLM for comparison, the width of the depletion region DR formed with respect to the second optical waveguide OW2 having the width of 400 nm is about 200 nm, and the interior of the second optical waveguide OW2 cannot be sufficiently depleted.

On the other hand, in the optical modulator LM according to the present embodiment, the fixed charge layers FCL cover the optical modulator LM. As a result, inversion layer is formed on the surfaces (upper surface and side surfaces) of the n-type semiconductor portion SRn in the second optical waveguide OW2. When the reverse-bias voltage is applied to the optical modulator LM under the same condition as the above-mentioned condition, in the optical modulator LM according to present embodiment, as shown in FIG. 6, not only the depletion region DR expands from the p-n junction surface but also the depletion region DR expands from the inversion layer. That is, in the optical modulator LM according to the present embodiment, the depletion region DR also extends from the first side surface SS1 of the second optical waveguide OW2 and the upper surface of the second optical waveguide OW2. Therefore, a size of the depletion region DR can be increased by about 1.3 times as compared with the comparative optical modulator RLM. That is, the modulation efficiency of the optical modulator LM is improved. From the viewpoint of enlarging the region where the inversion layer is formed and expanding the depletion region DR in a wider range, it is preferable that the area occupied by the n-type semiconductor portion SPn is larger than the area occupied by the p-type semiconductor portion SPp in the cross section perpendicular to the extension direction of the second optical waveguide OW2.

(2) The action of the fixed charge layer FCL on the optical waveguide

Figure 7:
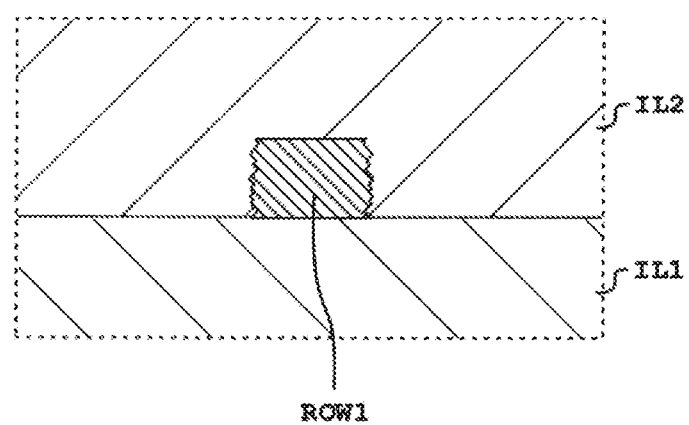
FIG. 7 is a partial enlarged cross-sectional view showing a comparative first optical waveguide.
Figure 8:
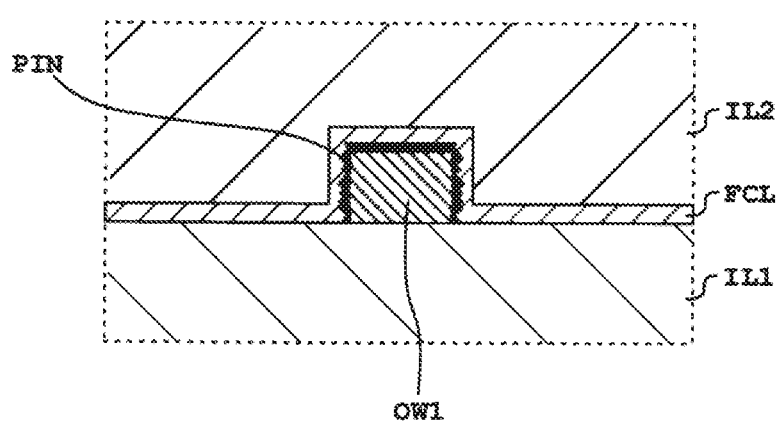
FIG. 8 is a partial enlarged cross-sectional view showing a first optical waveguide according to the embodiment.

For comparison, the first optical waveguide ROW1 (hereinafter also referred to as "first optical waveguide for comparison") which is not covered with the fixed charge layer FCL will also be described. FIG. 7 is a partial enlargement cross-sectional view showing a comparative first optical waveguide ROW1, and FIG. 8 is a partial enlargement cross-sectional view showing a first optical waveguide OW1 according to present embodiment. In FIGS. 7 and 8, the roughness (also referred to as "line edge roughness") of the side surfaces of the first optical waveguides ROW1 and OW1 is emphasized.

When the first optical waveguide ROW1 is formed by dry etching the semiconductor layer, as shown in FIG. 7, the surface roughness of the side surface of the first optical waveguide ROW1 tends to be larger than the surface roughness of the upper surface of the first optical waveguide OW1. Therefore, when light propagates in the first optical waveguide OW1, optical loss (propagation loss) may occur due to line edge roughness of the first optical waveguide OW1.

However, the first optical waveguide OW1 according to the present embodiment is covered with the fixed-charge layer FCL. As a result, as shown in FIG. 8, p-type inversion layer PIN is formed on the surfaces of the first optical waveguide OW1. Light propagating in the first optical waveguide OW1 hardly reaches the surfaces of the first optical waveguides OW1 due to the presence of the p-type inversion layer PIN. Therefore, the above-mentioned propagating loss caused by the line edge roughness of the first optical waveguide OW1 is reduced.

Next, an exemplary method of manufacturing the semiconductor device SD according to present embodiment will be described. FIGS. 9 to 17 are cross-sectional views showing example of a primary portion of the steps included in the method of manufacturing the semiconductor device SD.

The method of manufacturing the semiconductor device SD according to the present embodiment includes (1) a step of providing a semiconductor wafer SW, (2) a step of forming the optical elements, (3) a step of forming the fixed charge layer FCL, and (4) a step of forming the wiring layer.

(1) Providing of a Semiconductor Wafer

Figure 9:
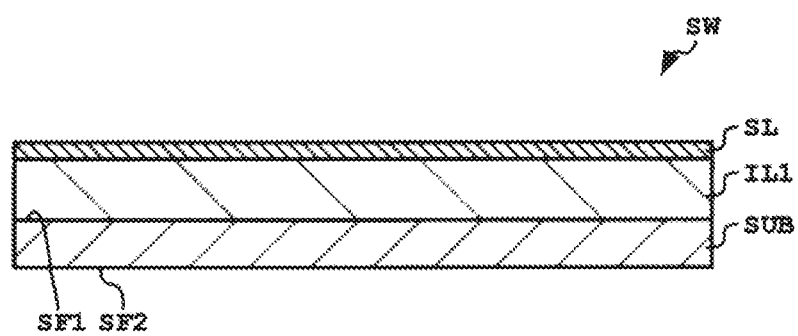
FIG. 9 is a cross-sectional view of primary portion showing an exemplary process included in the method of manufacturing the semiconductor device according to the embodiment.

First, as shown in FIG. 9, the semiconductor wafer SW having a semiconductor substrate SUB having a first surface (top surface) SF1 and a second surface (back surface) SF2, a first insulating layer IL1 formed on a first surface SF1 of the semiconductor substrate SUB, and a semiconductor layer SL formed on a first insulating layer IL1 is provided. The semiconductor wafer SW may be manufactured or purchased as a commercial product.

The semiconductor wafer SW is, for example, a Silicon On Insulator (SOI) substrate. The method of manufacturing SOI substrate can be appropriately selected from a known manufacturing method. Example of manufacturing SOI substrate includes Separation by Implantation of Oxygen (SIMOX) method and smart-cut method.

Example of material for semiconductor substrate SUB is described above. A thickness of the substrate SUB is, for example, 700 µm to 900 µm. Example of material and thickness of the first insulating layers IL1 is as described above. Example of material for the semiconductor layer SL includes silicon and germanium. The crystal structure of the material of the semiconductor layer SL may be single crystal or polycrystalline.

(2) Formation of the Optical Elements

Figure 10:
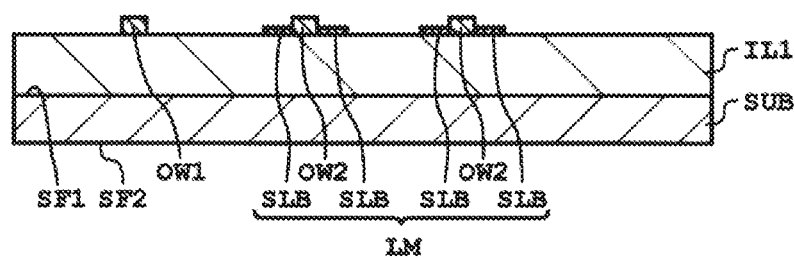
FIG. 10 is a cross-sectional view of primary portion showing an exemplary process included in the method of manufacturing the semiconductor device according to the embodiment.

Next, as shown in FIG. 10, the semiconductor wafer SW provided is processed to form optical elements such as the first optical waveguide OW1 and the optical modulator LM. In the present embodiment, the first optical waveguide OW1 and the optical modulator LM having the second optical waveguide OW2 and the slab portions SLB are formed by the following procedures. As a method of forming the above-mentioned optical element, a known method of forming an optical element in the silicon photonics technology can be appropriately adopted.

First, the first optical waveguide OW1, the second optical waveguide OW2, and the slab portions SLB are formed by patterning the semiconductor layer SL. Specifically, the semiconductor layer SL is patterned by a known photolithography technique and etching technique. The etching method of the semiconductor layer SL is not particularly limited, and is, for example, a dry etching method. The above procedure is repeated to pattern the semiconductor layer SL into a desired shape. As a result, the first optical waveguide OW1, the second optical waveguide OW2, and the slab portions SLB can be formed.

Next, an n-type impurity having a desired impurity density is implanted into the second optical waveguide OW2 and the slab portion SLB by photolithography and ion implantation. Similarly, a p-type impurity having a desired impurity density is injected into the second optical waveguide OW2 and the slab portion SLB. Thus, the n-type semiconductor portion SPn and the p-type semiconductor portion SPp described in FIG. 4 can be formed. As described above, the first optical waveguide OW1 and the optical modulator LM can be formed.

(3) Formation of the Fixed Charge Layer

Figure 11:
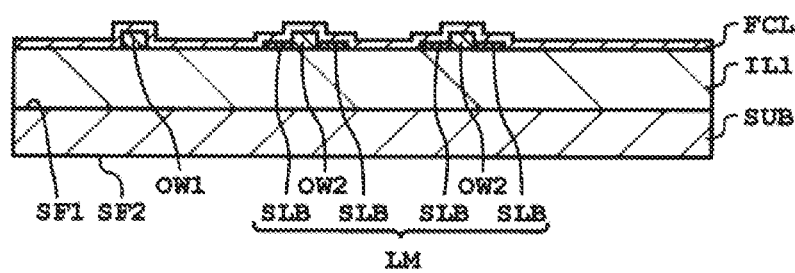
FIG. 11 is a cross-sectional view of primary portion showing an exemplary process included in the method of manufacturing the semiconductor device according to the embodiment.

Next, as shown in FIG. 11, a fixed charge layer FCL is formed on the first insulating layer IL1 so as to cover the first optical waveguide OW1 and the optical modulator LM. As the fixed charge layer FCL, for example, a material constituting the fixed charge layer FCL may be deposited. Example of method for forming the fixed charge layer FCL include chemical vapor deposition (CVD) method, sputtering method, and atomic layer deposition (ALD) method.

(4) Formation of the Wiring Layer

Next, the wiring layer is formed on the fixed-charge layer FCL. As described above, in the present embodiment, the step of forming the wiring layer includes the step of forming the second insulating layer IL2, the step of forming the first plug PL1, the step of forming the first wiring WR1, the step of forming the third insulating layer IL3, the step of forming the second plug PL2, the step of forming the second wiring WR2, and the step of forming the protective film PF.

Figure 12:
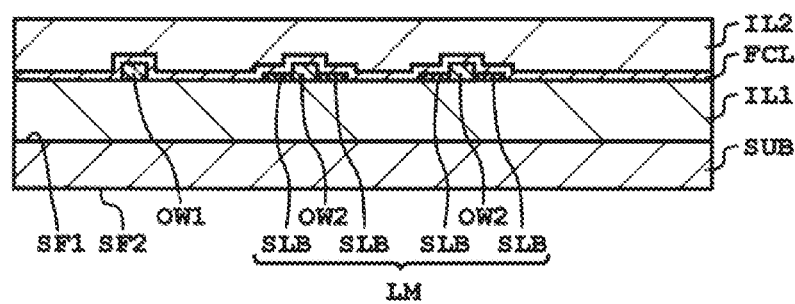
FIG. 12 is a cross-sectional view of primary portion showing an exemplary process included in the method of manufacturing the semiconductor device according to the embodiment.

First, as shown in FIG. 12, a second insulating layer IL2 is formed on the fixed charge layer FCL so as to cover the first optical waveguide OW1 and the optical modulator LM. The method of forming the second insulating layer IL2 is not particularly limited, and may be appropriately selected from known methods. Example of the method of forming the second insulating layer IL2 includes a CVD method. Example of material constituting the second insulating layers IL2 is as described above. Note that the upper surface of the second insulating layer IL2 may be subjected to a planarization treatment as required. Example of planarization treatment of the upper surface of the second insulating layer IL2 include a reflow method, an etch-back method, and a Chemical mechanical polishing (CMP) method.

Figure 13:
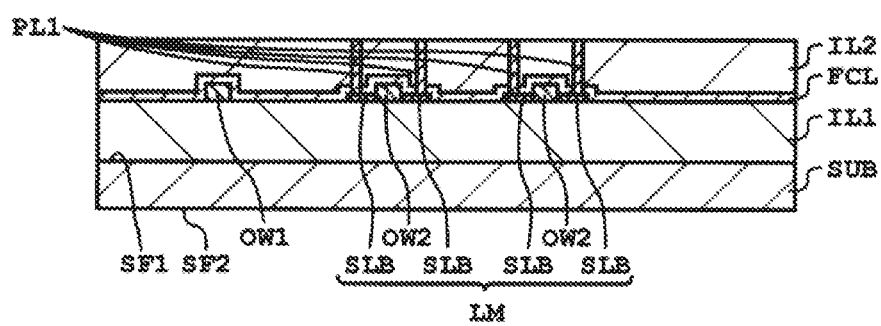
FIG. 13 is a cross-sectional view of primary portion showing an exemplary process included in the method of manufacturing the semiconductor device according to the embodiment.

Next, as shown in FIG. 13, first plugs PL1 reaching the slab portions SLB in the optical modulator LM are formed. Specifically, after a through hole is formed in the second insulating layer IL2, a conductive film may be formed so as to fill the through hole. The method of forming the first plug PL1 is not particularly limited, and may be appropriately selected from known method. Example of the material of the conductive film includes tungsten.

Figure 14:
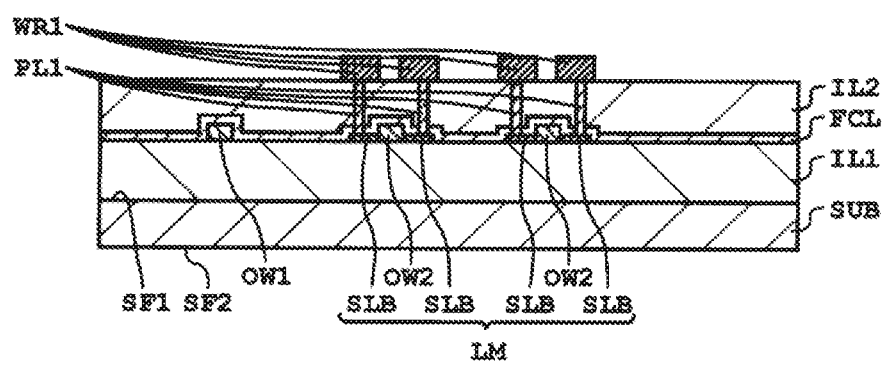
FIG. 14 is a cross-sectional view of primary portion showing an exemplary process included in the method of manufacturing the semiconductor device according to the embodiment.

Next, as shown in FIG. 14, a first wiring WR1 electrically connected to the first plug PL1 is formed. In present embodiment, the first wiring WR1 is an aluminum wiring formed on the second insulating IL2. The method of forming the first wiring WR1 is not particularly limited, and may be appropriately selected from known methods. For example, the first wiring WR1 can be formed by forming a stacked film in which a titanium layer, a titanium nitride layer, an aluminum layer, a titanium nitride layer, and a titanium layer are stacked in this order on the second insulating layer IL2 by a sputtering method, and then patterning the stacked film.

Figure 15:
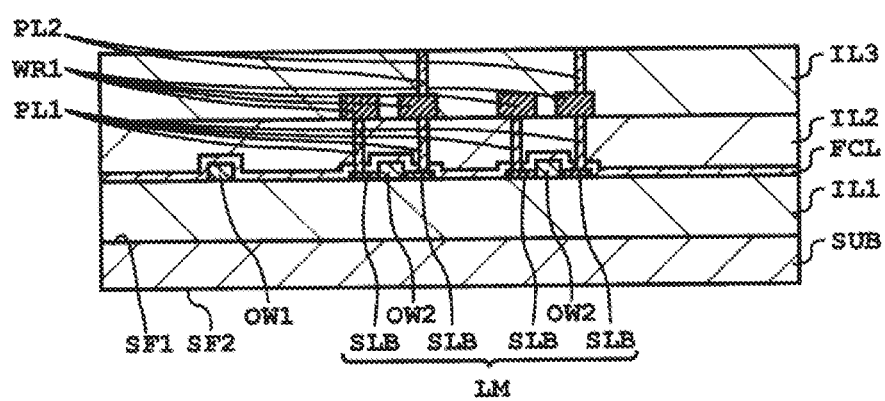
FIG. 15 is a cross-sectional view of primary portion showing an exemplary process included in the method of manufacturing the semiconductor device according to the embodiment.

Next, as shown in FIG. 15, after the third insulating layer IL3 is formed on the second insulating layer IL2, the second plugs PL2 are formed in the third insulating layer IL3. In present embodiment, the third insulating layer IL3 is formed on the second insulating layer IL2 so as to cover the first wiring WR1. The second plugs PL2 are formed to reach the first wiring WR1. Example of the method of forming the third insulating layer IL3 is similar to the method of forming the second insulating layer IL2. Example of the method of forming the second plug PL2 is similar to the method of forming the first plug PL1.

Figure 16:
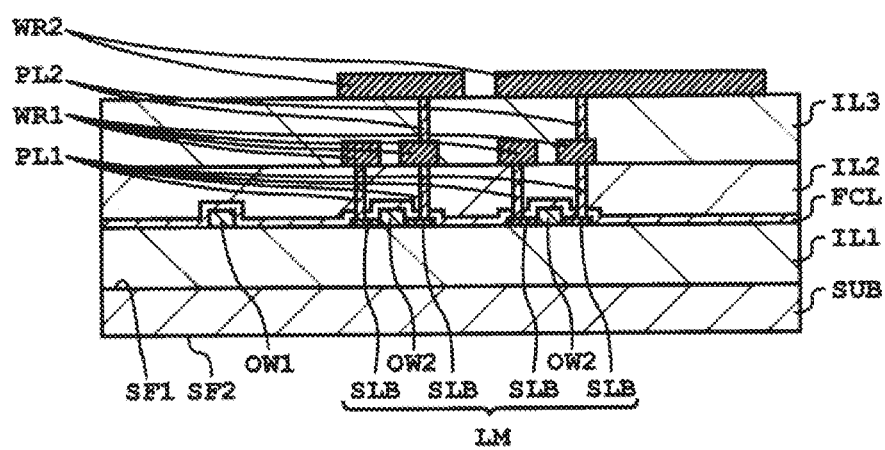
FIG. 16 is a cross-sectional view of primary portion showing an exemplary process included in the method of manufacturing the semiconductor device according to the embodiment.

Next, as shown in FIG. 16, a second wiring WR2 electrically connected to the second plug PL2 is formed. In present embodiment, the second wiring WR2 is an aluminum wiring formed on the third insulating IL3. Examples of the method of forming the second wiring WR2 is similar to the same as the method of forming the first wiring WR1.

Figure 17:
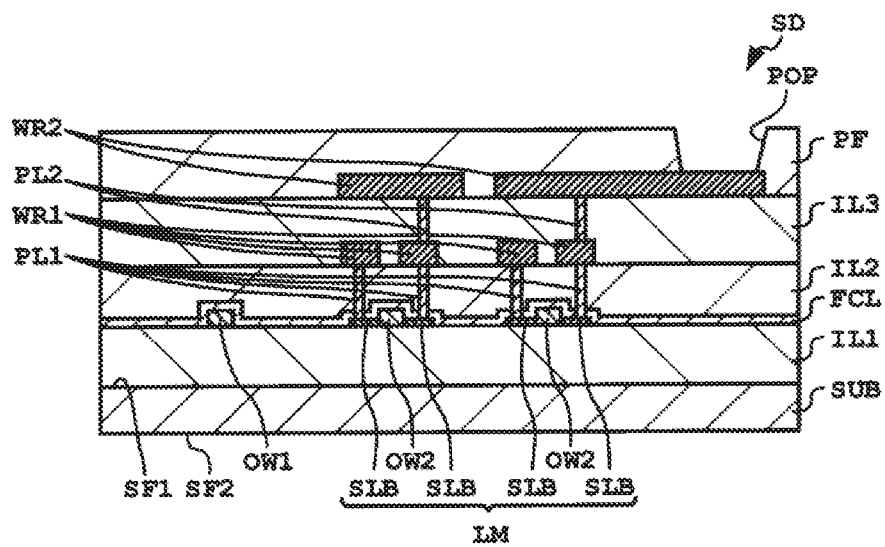
FIG. 17 is a cross-sectional view of primary portion showing an exemplary process included in the method of manufacturing the semiconductor device according to the embodiment.

Next, as shown in FIG. 17, the protective film PF is formed on the third insulating layer IL3. In present embodiment, the protective film PF is formed on the third insulating layer IL3 so as to cover the second wiring WR2. The method of forming the protective film PF is not particularly limited, and may be appropriately selected from known methods. Example of the material of the protective film PF is as described above. Next, a portion of the protective film PF located on the second wiring WR2 is removed. As a result, the pad opening POP exposing a portion of the second wiring WR2 can be formed in the protective film PF.

Finally, a plurality of singulated semiconductor devices SD are obtained by dicing the semiconductor wafer SW.

According to the above manufacturing method, the semiconductor device SD related to present embodiment can be manufactured. The method of manufacturing the semiconductor device SD according to the present embodiment may further include other steps as required. For example, examples of other processes include a process of arranging a laser diode as a light source, a process of forming a grating coupler, a process of forming a spot size converter, and a process of forming a optical receiver. The other steps may be suitably adopted from the formation methods known in the silicon photonics art.

The semiconductor device SD according to the present embodiment have fixed charge layer FCL covering the first optical waveguide OW1 and the light modulating portion LM including the second optical waveguide OW2. As a result, the propagation loss in the first optical waveguide OW1 and the propagation loss in the second optical waveguide OW2 is reduced. In addition, in the optical modulator LM, the depletion region DR can be formed over a wide range. As a result, the modulation efficiency of the optical modulator LM is improved, so that the optical modulator LM can be miniaturized. As a result, the characteristics of the semiconductor device SD can be enhanced in the semiconductor device SD according to the present embodiment.

MODIFICATION

Figure 18:
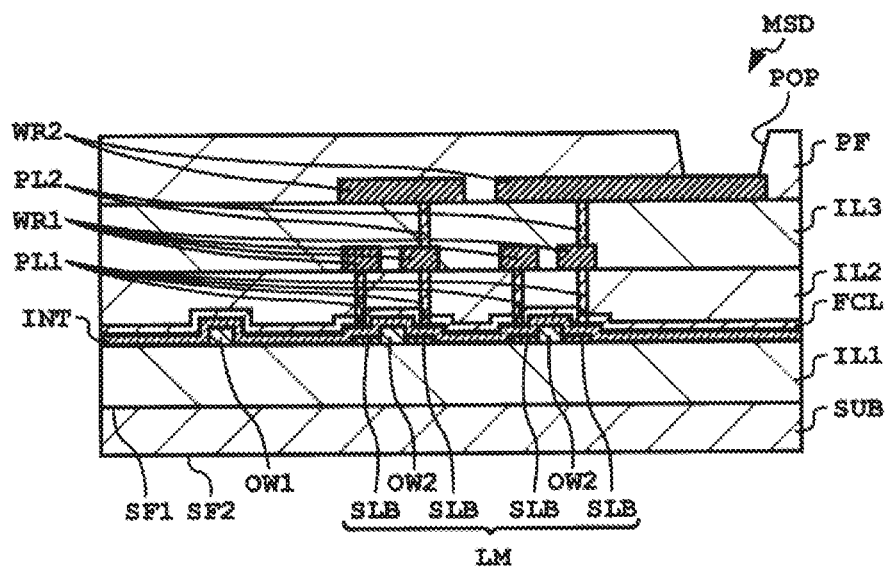
FIG. 18 is a cross-sectional view showing an exemplary configuration of a primary portion of a semiconductor device according to a modification.

FIG. 18 is a primary portion cross-sectional view showing an exemplary configuration of semiconductor device MSD according to modification.

As shown in FIG. 18, the semiconductor device MSD according to the modification further includes an intermediate layer INT formed between at least the second optical waveguide OW2 and the fixed-charge layer FCL. In the present modification, the interlayer INT is formed so as to cover both the first optical waveguide OW1 and the second optical waveguide OW2. The fixed-charge layer FCL is formed on the first insulating layer IL1 so as to cover the first optical waveguide OW1 and the optical modulator LM with the intermediate layer INT interposed therebetween. The interlayer INT directly contacts with the upper surface and the side surface of the first optical waveguide OW1 and with the upper surface and the side surface of the second optical waveguide OW2. The fixed-charge layer FCL is indirectly in contact with the upper surface and the side surface of the first optical waveguide OW1 and the upper surface and the side surface of the second optical waveguide OW2 through the intermediate layer INT.

Example of material constituting the interlayer INT includes silicon oxide ($SiO_2$) and silicon oxynitride (SiON). If the thickness of the intermediate layer INT is too small, the interface states of the second optical waveguide OW2 and the fixed-charge layer FCL tend not to be sufficiently reduced. If the thickness of the intermediate layer INT is too large, the inversion layer tends not to be formed. From this viewpoint, the thickness of the intermediate layer INT is preferably 1 nm or more and 5 nm or less.

The semiconductor device MSD according to modification reduces the interface potential of the second optical waveguide OW2 and the fixed-charge layer FCLs by the intermediate layer INT, thereby suppressing a variation in the size of the depletion region caused by a variation in hole/electron pairs that may occur in the Grown Recombination (GR) center when the number of interface potentials is great. As a result, the modulation operation of the optical modulator LM can be made more stable.

It should be noted that the present invention is not limited to the above-mentioned embodiments, and various modifications can be made without departing from the gist thereof. For example, although the semiconductor devices SD and MSD according to the above embodiment have the optical waveguide OW1 and the optical modulator LM as optical elements, the semiconductor devices SD and MSD may have other optical elements such as a grating coupler, a spot size converter, and an optical receiver as required.

In the above embodiment, the number of the wiring layers is two, but the number of the wiring layers may be three or more.

Although the first wiring WR1 and the second wiring WR2 are aluminum wiring, the first wiring WR1 and the second wiring WR2 may be copper wiring. In this instance, the copper wiring can be formed by, for example, a damascene method.

In addition, even when a specific numerical value example is described, it may be a numerical value more than the specific numerical value, or may be a numerical value less than the specific numerical value, except when it is theoretically obviously limited to the numerical value. In addition, the component means "B containing A as a main component" or the like, and the mode containing other components is not excluded.

What is claimed is:

1. A semiconductor device comprising:
   a first insulating layer;
   an optical waveguide formed on the first insulating layer such that a propagating direction of light propagating through the optical waveguide is along an upper surface of the first insulating layer;
   a fixed charge layer formed on the upper surface of the first insulating layer such that the fixed charge layer covers the optical waveguide; and
   a second insulating layer formed on the fixed charge layer.

2. The semiconductor device according to claim 1, wherein a material constituting the fixed charge layer is at least one material selected from a group consisting of hafnium oxide, aluminum oxide, zirconium oxide, tantalum oxide, titanium oxide, hafnium nitride, aluminum nitride, hafnium oxynitride, and aluminum oxynitride.

3. The semiconductor device according to claim 2, wherein the material constituting the fixed charge layer is hafnium oxide.

4. The semiconductor device according to claim 1, wherein the fixed charge layer contacts with an upper surface and both side surfaces of the optical waveguide.

5. The semiconductor device according to claim 1, comprising an intermediate layer formed between the optical waveguide and the fixed charge layer.

6. The semiconductor device according to claim 5, wherein a material constituting the intermediate layer is silicon oxide or silicon oxynitride.

7. The semiconductor device according to claim 1,
   wherein the optical waveguide includes a p-type semiconductor portion and an n-type semiconductor portion adjacent to each other in the widthwise direction of the optical waveguide, and
   wherein the fixed charge layer contacts with the n-type semiconductor portion.

8. The semiconductor device according to claim 7, wherein in a cross-sectional view perpendicular to an extension direction of the optical waveguide, an area occupied by the n-type semiconductor portion is larger than an area occupied by the p-type semiconductor portion.

9. The semiconductor device according to claim 8,
   wherein the optical waveguide has a first side surface and a second side surface located on opposite side in the optical waveguide,
   wherein the n-type semiconductor portion is located in the first side surface side of the optical waveguide,
   wherein the p-type semiconductor portion is located in the second side surface side of the optical waveguide, and
   wherein a junction surface of the p-type semiconductor portion and the n-type semiconductor portion is located closer to the second side surface than the first side surface in the widthwise direction of the optical waveguide.

10. The semiconductor device according to claim 1, wherein the optical waveguide constitutes a portion of an optical modulator.

11. The semiconductor device according to claim 1, wherein a material constituting the optical waveguide is silicon.

12. The semiconductor device according to claim 11, wherein materials constituting the first insulating layer and the second insulating layer are silicon oxide.

13. A method of manufacturing a semiconductor device, comprising:
    patterning a semiconductor layer formed on a first insulating layer by dry etching method to form an optical waveguide such that a propagating direction of light propagating through the optical waveguide is along an upper surface of the first insulating layer;
    forming a fixed charge layer on the upper surface of the first insulating layer so as to cover the optical waveguide; and
    forming a second insulating layer on the fixed charge layer.

14. The method of manufacturing the semiconductor device according to claim 13, wherein a material constituting the fixed charge layer is at least one material selected from a group consisting of hafnium oxide, aluminum oxide, zirconium oxide, tantalum oxide, titanium oxide, hafnium nitride, aluminum nitride, hafnium oxynitride, and aluminum oxynitride.

15. The method of manufacturing the semiconductor device according to claim 14, wherein a material constituting the fixed charge layer is hafnium oxide.

16. The method of manufacturing the semiconductor device according to claim 13, comprising:
    forming an intermediate layer on the first insulating layer so as to cover the optical waveguide between the forming the optical waveguide and the forming the second insulating layer.

17. The method of manufacturing the semiconductor device according to claim 16, wherein a material constituting the intermediate layer is silicon oxide or silicon oxynitride.

18. The method of manufacturing the semiconductor device according to claim 13, wherein the optical waveguide constitutes an optical modulator.

* * * * *